United States Patent

Sileno, Jr. et al.

[19]

[11] Patent Number: 5,829,469
[45] Date of Patent: Nov. 3, 1998

[54] APPARATUS FOR RETROFITTING A NON-PRESSURE BALANCED MIXING VALVE TO PROVIDE PRESSURE BALANCED OPERATION

[75] Inventors: Joseph P. Sileno, Jr., Milwaukee; Gary R. Mueller, Greendale, both of Wis.

[73] Assignee: Joseph P. Sileno, Jr. Revocable Trust, Milwaukee, Wis.

[21] Appl. No.: 558,156

[22] Filed: Nov. 15, 1995

Related U.S. Application Data

[63] Continuation-in-part of Ser. No. 541,923, Oct. 10, 1995, abandoned.

[51] Int. Cl.⁶ .......................... F16K 11/085; G05D 11/03
[52] U.S. Cl. ........................ 137/15; 137/98; 137/269; 137/359; 137/597
[58] Field of Search .................... 137/15, 269, 271, 137/359, 594, 597, 607, 98, 100

[56] References Cited

U.S. PATENT DOCUMENTS

| | | |
|---|---|---|
| 3,448,755 | 6/1969 | Symmons ........................ 137/100 |
| 3,823,737 | 7/1974 | Srymanski ........................ 137/607 |
| 3,823,742 | 7/1974 | Von Corpon ........................ 137/597 X |
| 3,960,016 | 6/1976 | Symmons ........................ 137/359 X |
| 4,022,242 | 5/1977 | Turecek ........................ 137/270 |
| 4,794,952 | 1/1989 | Burkard ........................ 137/597 |
| 4,901,750 | 2/1990 | Nicklas et al. ........................ 137/270 |
| 4,921,547 | 5/1990 | Kosarzecki ........................ 137/115 |
| 4,951,702 | 8/1990 | Brotcke ........................ 137/597 X |
| 4,979,530 | 12/1990 | Breda ........................ 137/100 |
| 5,146,951 | 9/1992 | Chuang ........................ 137/594 |
| 5,257,824 | 11/1993 | Eggen ........................ 137/359 X |
| 5,355,906 | 10/1994 | Marty et al. ........................ 137/98 |

*Primary Examiner*—Stephen M. Hepperle
*Attorney, Agent, or Firm*—Michael Best & Friedrich

[57] ABSTRACT

This apparatus is to retrofit an existing, non pressure balanced mixing valve to provide pressure balanced operation. The apparatus includes a diverter which leads hot and cold water out of the existing valve body to a pressure balanced mixing valve. The mixed blended water from the pressure balanced mixing valve is returned to the diverter which directs the blended water to the existing outlet(s) in the existing valve body.

8 Claims, 2 Drawing Sheets

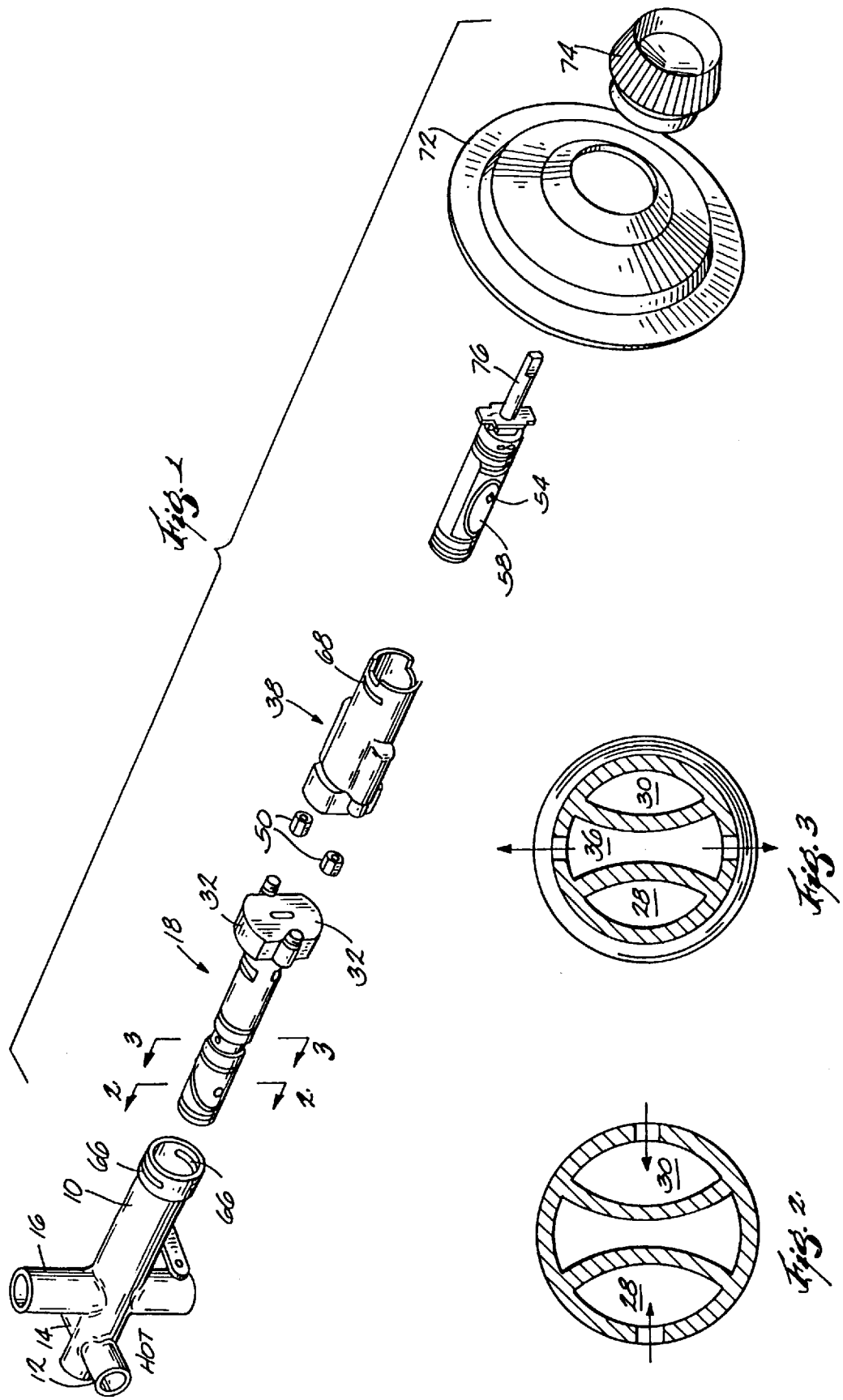

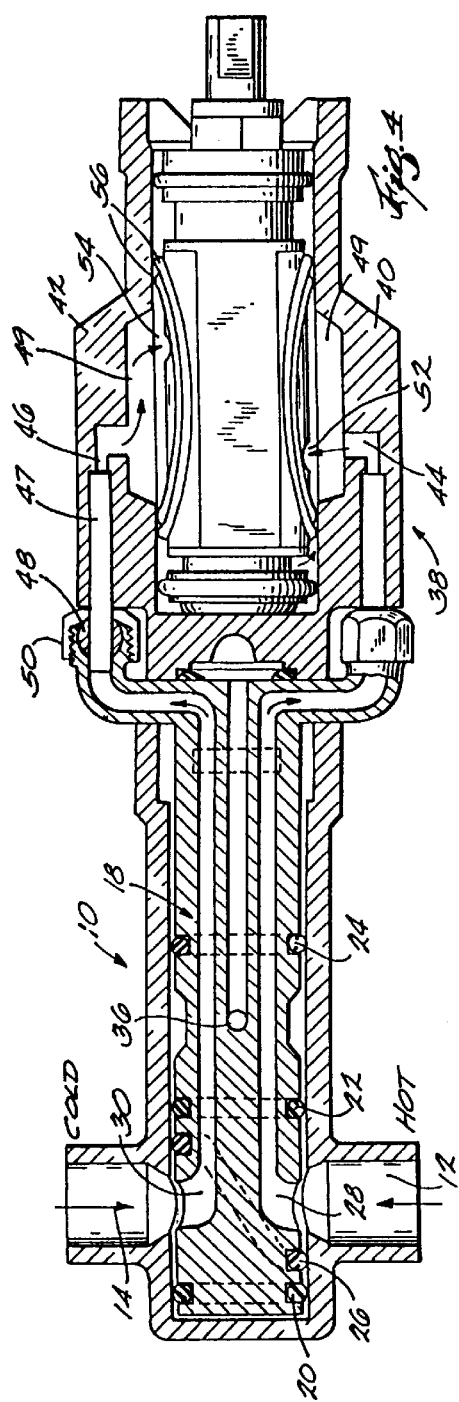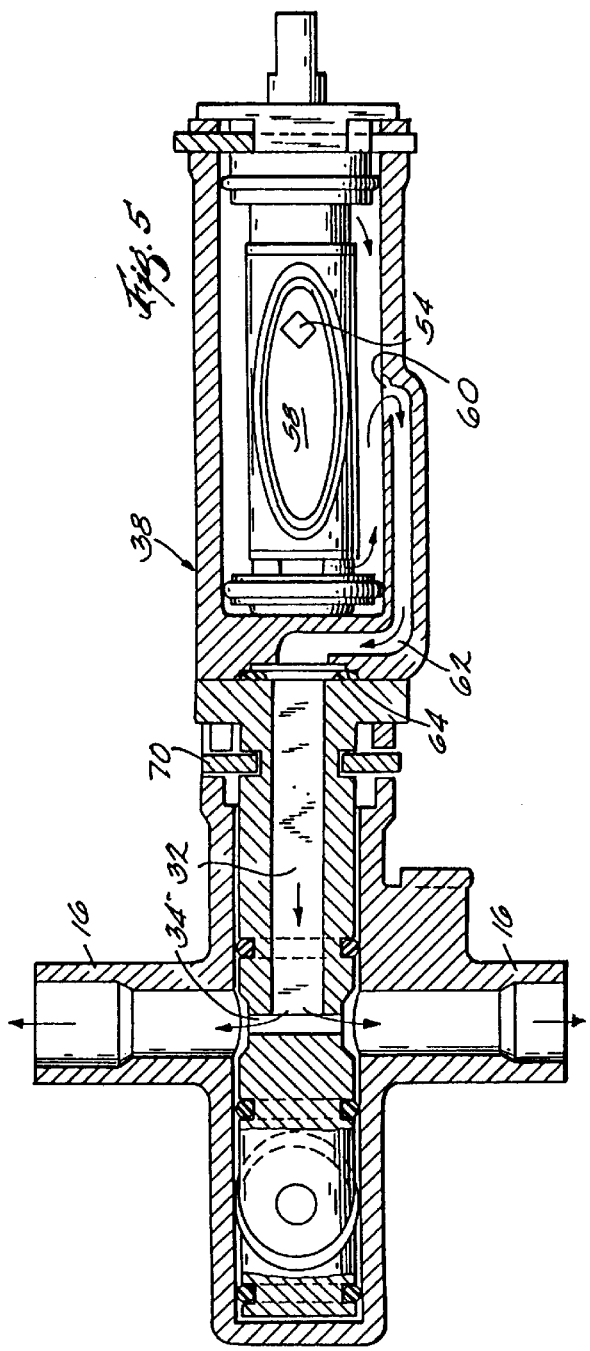

APPARATUS FOR RETROFITTING A NON-PRESSURE BALANCED MIXING VALVE TO PROVIDE PRESSURE BALANCED OPERATION

This application is a continuation-in-part of the earlier filed application of Joseph P. Sileno, Jr., filed Oct. 10, 1995, entitled "Apparatus for Retrofitting a Non-pressure Balanced Mixing Valve to Provide Pressure Balanced Operation" Ser. No. 541,923, now abandoned.

SUMMARY OF THE INVENTION

This invention makes it possible to replace the non-balanced parts of a mixing valve with apparatus which will provide pressure balanced operation of the mixing valve. There are many older mixing valve installations which do not have pressure balanced operation, usually because they predated the balanced valve technology. The user learns of that fact as soon as someone flushes a toilet or starts the "hot" fill of a washing machine while the user is in the shower. The bather is treated to a hot or cold shower, frequently resulting in some fancy footwork and cursing. Indeed, there is some thought that this experience has given rise to some modern dance steps.

The cost of replacing the valve with a pressure balanced valve is appreciable because it usually requires removal of tile to get enough room for the new valve. This requires removal of a lot of tile because you can't match old tile. The new tile requires the shower be taken out of service for about 3 or 4 days. The result is that the old valves remain in service and the irritation continues.

The object of this invention Is to make it possible to retrofit existing mixing valves with pressure balancing apparatus. The cost is between 10% and 20% of the cost of replacing the old valve.

The old valve installation has a body with hot and cold water inlets and an outlet leading to the tub and/or shower head. The interior parts are removed and replaced with the present apparatus which includes diverter section which receives water from the hot and cold inlets and pipes the water forward through longitudinal conduits to a pressure balancing cartridge which mixes the hot and cold water in the user-selected ratio which results in a desired temperature. Variation in the pressure in either inlet pressure to the balancing cartridge results in a change in the other supply so the temperature remains essentially constant (±2 degrees). The mixed water is returned to the old valve body through an axial conduit in the diverter which leads to the original valve outlet. The original knob and the concave escutcheon or face plate are discarded. A new, convex face plate is mounted and covers the parts of the new assembly which protrude because the water has to be brought forward and out of the old valve body. The conversion takes 15–30 minutes. While that form of conversion is shown in the drawings it may well be feasible to incorporate the pressure balancing cartridge in a new knob which would be used in place of the original knob while retaining the original escutcheon plate.

There are a number of manufacturers of pressure balanced mixing valves and the dimensions and configuration of the manufacturers do not match. Therefore, the diverter (adapter) and pressure-balancing sections are tailored to the valve being replaced and in many instances it may be more economical to obtain the pressure balancing portion from the original manufacturer.

The important feature of this invention is provision of a diverter section to direct the water supply forward out of the original valve body to a pressure balancing section or body where the water is pressure balanced and mixed and then returned to the diverter section which directs the water to the outlet in the original valve body.

BRIEF DESCRIPTION OF THE DRAWINGS

FIG. 1 is an exploded perspective view of the invention as applied to an existing original valve housing, FIG. 2 is a section through the diverter section of the invention as indicated by line 2—2 in FIG. 1, FIG. 3 is a section through FIG. I on line 3—3, FIG. 4 is a horizontal longitudinal section through the apparatus mounted in an existing original valve, and FIG. 5 is a vertical longitudinal section through the apparatus assembled in the existing original mixing valve.

DETAILED DESCRIPTION OF THE DRAWINGS

The housing 10 for the original non-balancing valve is shown at the left of FIG. 1 and has hot and cold water inlets 12, 14 leading to the central bore in which the old valve was mounted. The old valve is discarded in practice of this invention. The housing has two outlets 16, one leading down the tub and the other up to the shower head with the flow to one or the other determined by the diverter valve at the spout leading to the tub. This housing 10 is accessed by removing the original valve handle and escutcheon plate which are discarded.

The present retrofit or conversion assembly includes a generally cylindrical diverter 18 having an O-ring 20 at its left end, another O-ring 22 spaced from the first and a third O-ring 24 at about the middle of the diverter. A somewhat meandering groove is cut into the diverter between rings 20, 22 on a generally 45° angle as seen in FIG. 4 so the O-ring 24 mounted therein separates the hot and cold water streams from inlets 12, 14, respectively, and directs each to a conduit 28, 30 respectively. In those installations where the hot and cold lines are reversed (for example, in back-to-back installations) the meandering groove permits in the diverter to be rotated 180 degrees the re-orient the hot and cold feed as is common practice in valves made by Moen. Each of these conduits provides a longitudinal conduit forward (towards the tub/shower) out of the diverter and the valve housing 10. The diverter body has a generally radial head 32 at its right end. Also at the right end of the diverter each conduit 28, 30 leads outwardly and then turns forward to project slightly beyond the end of the diverter. The diverter is also provided with an axial conduit 34 leading from the right end of the diverter to cross bore 36 which leads to the annular space between O-rings 22, 24 and then to the outlets 16, 16. Thus, the diverter is structured to lead the hot and cold water streams to the right and out of the diverter and also to return mixed or blended water to the left down the axis of the diverter to the valve outlet 16.

The diverter 18 supplies hot and cold water to and receives blended water from the pressure balancing mixing valve housing 38 having radially opposed raised ribs 40, 42 respectively, enclosing hot and cold water inlets 44, 46, respectively, each of which is connected to a corresponding water conduit in the diverter by a stub tube 47 extending between the inlet and the conduit in the diverter and sealed against leakage by packing 48 around the tube and retained/compressed by nut 50. In other embodiments, such as when the stub tube is precision molded for self-sealing, the diverter may not include packing to seal against leakage.

As best seen in FIG. 4, inlets 44, 46 terminate in elongated openings 49, 49 to the central bore in the valve body 38. This ensures communication with the inlets 52, 54 inside the raised sealing ribs 56 surrounding the partially flat inlets areas on opposed sides of the pressure balancing cartridge 58. The pressure balancing is done inside the cartridge 58 and the details of this balancing mechanism are unimportant to this invention. Suffice it to say, there is a sleeve inside the cartridge which controls flow and the ratio of hot to cold water. The sleeve also houses a sleeve which moves in response to the hot and cold water pressures acting on the spool. If one pressure becomes higher than the other, the spool acts to throttle or reduce the higher pressure by closing the flow path as necessary until balance is achieved and the selected mixing ratio (which translates as the output temperature) is restored. This works very fast and the bather does not notice any change. The pressure balancing is fast and sure and will maintain the outlet temperature constant ±2°. Shaft 76 extends from a sleeve inside the cartridge and is turned to select the blending ratio of the hot and cold water and also to start or shut off flow. The hot and cold water leaves the cartridge through the cartridge ends (hot on right and cold on left in FIG. 4) in the proper ratio, mixes and goes out port 60 and through conduit 62 which turns to the center of body 38 to communicate with the central axial bore 34 in diverter 18. The joint between the diverter and body 38 is sealed by O-ring 64.

The balancing valve shown here is made by Moen. Other manufacturers (notably Delta) make pressure balancing valves which will require changes in the configuration of the diverter or the pressure balancing valve 38 to accommodate the differing design approaches. The principle of this invention remains the same, however, in that the diverter (with design adapted to the housing/valve be retrofitted) directs the hot and cold water out of the original valve body to a pressure balancing valve (of appropriate design) which then returns blended water to the diverter which supplies the blended water to the outlet(s) in the original valve body.

The original valve body has slots 66 through which a retaining clip 38 passes to engage and retain the valve and this method of mounting is retained in the present design to retain the diverter in the valve body. The new valve body 38 has slots 68 to receive retaining clip 70. As mentioned above, the original escutcheon plate and handle are discarded. Such plates are customarily concave and there would be no room for the present construction. Therefore, a new convex escutcheon plate 72 is used with a new knob or handle 74 mounted on shaft 76 which projects from the sleeve inside the cartridge 58. In another embodiment (not shown), the original escutcheon plate can be used and the sleeve can be received in the handle.

We claim:

1. Apparatus for retrofitting an existing non pressure balanced mixing valve housing having a hot water inlet, a cold water inlet and an outlet, comprising, a diverter sized to fit inside said valve housing and having a hot water conduit positioned to communicate with said hot water inlet in said existing valve housing and extending longitudinally of said diverter to extend beyond said valve housing, said diverter including a cold water conduit positioned to communicate with said cold water inlet in said existing valve housing and extending longitudinally of said diverter to extend beyond said valve housing, said diverter including a longitudinally extending mixed water conduit leading from the portion of said diverter body which extends beyond said valve housing to said outlet in said existing valve housing, a pressure balancing mixing valve body connected to said diverter and having hot and cold water inlets respectively communicating with said hot and cold water conduits in said diverter and also having a blended water outlet communicating with said mixed water conduit in said diverter, a pressure balancing means mounted in said pressure balancing mixing valve body and responding to variations in pressure of the hot and cold water to maintain a selected ratio of hot to cold water and to blend hot and cold water to provide blended water at a selected substantially uniform temperature, and means for operating said balancing means and for selecting the selected ratio of hot to cold water.

2. The method of upgrading or retrofitting existing shower/tub mixing valves which are prone to scald the bather by reason of not having either a temperature controlled or a pressure balanced valve, comprising the steps of, removing and discarding the mixing valve parts leaving only the original valve body connected to the plumbing system, and mounting a diverter in said housing, said diverter including hot and cold conduits communicating with said hot and cold water inlets, said diverter also including a mixed water conduit and extending beyond said housing, connecting a pressure balancing mixing valve body to said diverter, said pressure balanced mixing valve body having hot and cold water inlets respectively communicating with said hot and cold water conduits in said diverter and also having a blended water outlet communicating with said mixed water conduit in said diverter, mounting a pressure balancing means in said pressure balancing mixing valve body, said pressure balancing means responding to variations in pressure of the hot and cold water to maintain a selected ratio of hot to cold water and to blend hot and cold water to provide blended water at a selected substantially uniform temperature, and mounting an escutcheon plate to cover the diverter and valve body.

3. Apparatus for retrofitting an existing non pressure balanced mixing valve housing having a hot water inlet, a cold water inlet and an outlet, comprising, a diverter sized to fit inside said valve housing and having a hot water conduit positioned to communicate with said hot water inlet in said existing valve housing and extending longitudinally of said diverter to extend beyond said valve housing, said diverter including a cold water conduit positioned to communicate with said cold water inlet in said existing valve housing and extending longitudinally of said diverter to extend beyond said valve housing, said diverter including a longitudinally extending mixed water conduit leading from the portion of said diverter body which extends beyond said valve housing to said outlet in said existing valve housing, a pressure balancing mixing valve body mounted on said diverter and having hot and cold water inlets respectively communicating with said hot and cold water conduits in said diverter and also having a blended water outlet communicating with said mixed water conduit in said diverter, flow regulating means mounted in said pressure balancing mixing valve body for controlling flow from said conduits and to select a ratio of hot to cold water, pressure balancing means mounted in said pressure balancing mixing valve body and responding to variations in pressure of the hot and cold water to maintain the selected ratio and to blend hot and cold water to provide blended water at a selected substantially uniform temperature, and a manually operated knob for operating said flow regulating means.

4. The method of upgrading or retrofitting existing shower/tub mixing valves which are prone to scald the bather by reason of not having either a temperature controlled or a pressure balanced valve, comprising the steps of, removing and discarding the mixing valve parts including the associated escutcheon plate and operating knob leaving only the original valve housing connected to the hot and cold water lines and the mixed water line of the plumbing system, mounting a diverter in said housing, said diverter including hot and cold water conduits and a mixed water conduit communicating with said hot and cold and mixed water lines, said diverter extending beyond said housing, a pressure balancing mixing valve body mounted on said diverter and having hot and cold water inlets respectively communicating with said hot and cold water conduits in said diverter and also having a blended water outlet communicating with said mixed water conduit in said diverter, flow regulating means mounted in said pressure balancing mixing valve body for controlling flow from said conduits and to select a ratio of hot to cold water, said flow regulating means including an operating shaft, pressure balancing means mounted in said pressure balancing mixing valve body and responding to variations in pressure of the hot and cold water to maintain the selected ratio and to blend hot and cold water to provide blended water at a selected substantially uniform temperature, and the method including the further step of mounting a convex escutcheon plate to cover the installation with said operating shaft projecting therefrom.

5. Apparatus for retrofitting an existing non pressure balanced mixing valve housing having a hot water inlet, a cold water inlet and an outlet, comprising, a diverter mounted in said existing valve housing and extending out of said housing, a pressure balancing mixing valve mounted on said diverter and having hot and cold water inlets and a mixed water outlet, and discrete conduit means in said diverter interconnecting the hot and cold water inlets in said existing valve housing with said hot and cold water inlets on said pressure balancing mixing valve and connecting said outlet in said existing valve housing to said mixed water outlet.

6. Apparatus for retrofitting an existing non pressure balanced mixing valve housing having a hot water inlet, a cold water inlet and an outlet, comprising, a diverter sized to fit inside said valve housing and having a hot water conduit positioned to communicate with said hot water inlet in said existing valve housing and extending longitudinally of said diverter to extend beyond said valve housing, said diverter including a cold water conduit positioned to communicate with said cold water inlet in said existing valve housing and extending longitudinally of said diverter to extend beyond said valve housing, said diverter including a longitudinally extending mixed water conduit leading from the portion of said diverter body which extends beyond said valve housing to said outlet in said existing valve housing, said diverter including a pressure balancing mixing valve body having hot and cold water inlets respectively communicating with said hot and cold water conduits in said diverter and also having a blended water outlet communicating with said mixed water conduit in said diverter, flow regulating means mounted in said pressure balancing mixing valve body for controlling flow from said conduits and to select a ratio of hot to cold water, pressure balancing means mounted in said pressure balancing mixing valve body and responding to variations in pressure of the hot and cold water to maintain the selected ratio and to blend hot and cold water to provide blended water at a selected substantially uniform temperature, and a manually operated knob for operating said flow regulating means.

7. The method of upgrading or retrofitting existing shower/tub mixing valves which are prone to scald the bather by reason of not having either a temperature controlled or a pressure balanced valve, comprising the steps of, removing and discarding the mixing valve parts leaving only the original valve housing connected to the hot and cold water lines and the mixed water line of the plumbing system, mounting a diverter in said housing, said diverter including hot and cold water conduits and a mixed water conduit communicating with said hot and cold and mixed water lines, said diverter extending beyond said housing, said diverter including a pressure balancing mixing valve body having hot and cold water inlets respectively communicating with said hot and cold water conduits in said diverter and also having a blended water outlet communicating with said mixed water conduit in said diverter, flow regulating means mounted in said pressure balancing mixing valve body for controlling flow from said conduits and to select a ratio of hot to cold water, said flow regulating means including an operating shaft, pressure balancing means mounted in said pressure balancing mixing valve body and responding to variations in pressure of the hot and cold water to maintain the selected ratio and to blend hot and cold water to provide blended water at a selected substantially uniform temperature, and the method including the further step of mounting an escutcheon plate to cover the installation with said operating shaft projecting therefrom.

8. Apparatus for retrofitting an existing non pressure balanced mixing valve housing having a hot water inlet, a cold water inlet and an outlet, comprising, a diverter mounted in said existing valve housing and extending out of said housing, said diverter including a pressure balancing mixing valve having hot and cold water inlets and a mixed water outlet, and discrete conduit means in said diverter interconnecting the hot and cold water inlets in said existing valve housing with said hot and cold water inlets to said pressure balancing mixing valve and connecting said outlet in said existing valve housing to said mixed water outlet.

* * * * *

UNITED STATES PATENT AND TRADEMARK OFFICE
CERTIFICATE OF CORRECTION

PATENT NO. : 5,829,469
DATED : November 3, 1998
INVENTOR(S) : Joseph P. Sileno, Jr. and Gary R. Mueller It is certified that error appears in the above-indentified patent and that said Letters Patent is hereby corrected as shown below:

Column 2, line 11, "FIG. I" should be "FIG. 1".

Column 2, line 35, "24" should be "26".

Column 2, line 40, the first occurrence of "the" should be "to".

Column 3, line 37, "38" should be "70".

Signed and Sealed this

Twenty-sixth Day of October, 1999

Attest:

Q. TODD DICKINSON

Attesting Officer

Acting Commissioner of Patents and Trademarks